United States Patent
Fung et al.

[19]

[11] Patent Number: 5,822,610
[45] Date of Patent: *Oct. 13, 1998

[54] MAPPABLE FUNCTIONS FROM SINGLE CHIP/MULTI-CHIP PROCESSORS FOR COMPUTERS

[75] Inventors: Henry Tat Fung; Phillip Merle Mitchell, both of San Jose, Calif.

[73] Assignee: Vadem Corporation, San Jose, Calif.

[ * ] Notice: The term of this patent shall not extend beyond the expiration date of Pat. No. 5,671,433.

[21] Appl. No.: 754,842

[22] Filed: Nov. 22, 1996

Related U.S. Application Data

[63] Continuation of Ser. No. 478,313, Jun. 7, 1995, Pat. No. 5,671,433, which is a continuation of Ser. No. 947,471, Sep. 18, 1992, abandoned.

[51] Int. Cl.$^6$ .................................................. G06F 13/36
[52] U.S. Cl. ............................... 395/800.39; 395/800.28; 395/800.29; 395/800.3; 395/800.43; 395/821; 395/868; 395/871; 395/872
[58] Field of Search ............................ 395/800, 800.39, 395/800.43, 800.28, 800.29, 800.3, 821, 868, 872, 871; 364/DIG. 1

[56] References Cited

U.S. PATENT DOCUMENTS

| | | | |
|---|---|---|---|
| 4,110,823 | 8/1978 | Cronshaw et al. | 395/474 |
| 4,292,465 | 9/1981 | Wilson et al. | 178/3 |
| 4,530,047 | 7/1985 | Rogers et al. | 395/562 |
| 4,626,985 | 12/1986 | Briggs | 395/800 |
| 4,823,256 | 4/1989 | Bishop et al. | 395/182.08 |
| 5,081,576 | 1/1992 | Ward | 395/289 |
| 5,175,865 | 12/1992 | Hillis | 395/800 |
| 5,313,648 | 5/1994 | Ehlig et al. | 395/800 |

*Primary Examiner*—Alyssa H. Bowler
*Assistant Examiner*—Dzung C. Nguyen
*Attorney, Agent, or Firm*—Oblon, Spivak, McClelland, Maier & Neustadt, P.C.

[57] ABSTRACT

A distributed computer system comprising a plurality of engines where each engine is useable to form a separate, integrated computer system. The distributed computer system is the functional equivalent of the separate, integrated computer system. An engine on a computer chip has mappable I/O pins that provide selective and mappable access to internal chip locations. A mapper is provided on the chip for mapping the I/O pins. One or more chips with mappable pins are employed to form a computer engine.

5 Claims, 5 Drawing Sheets

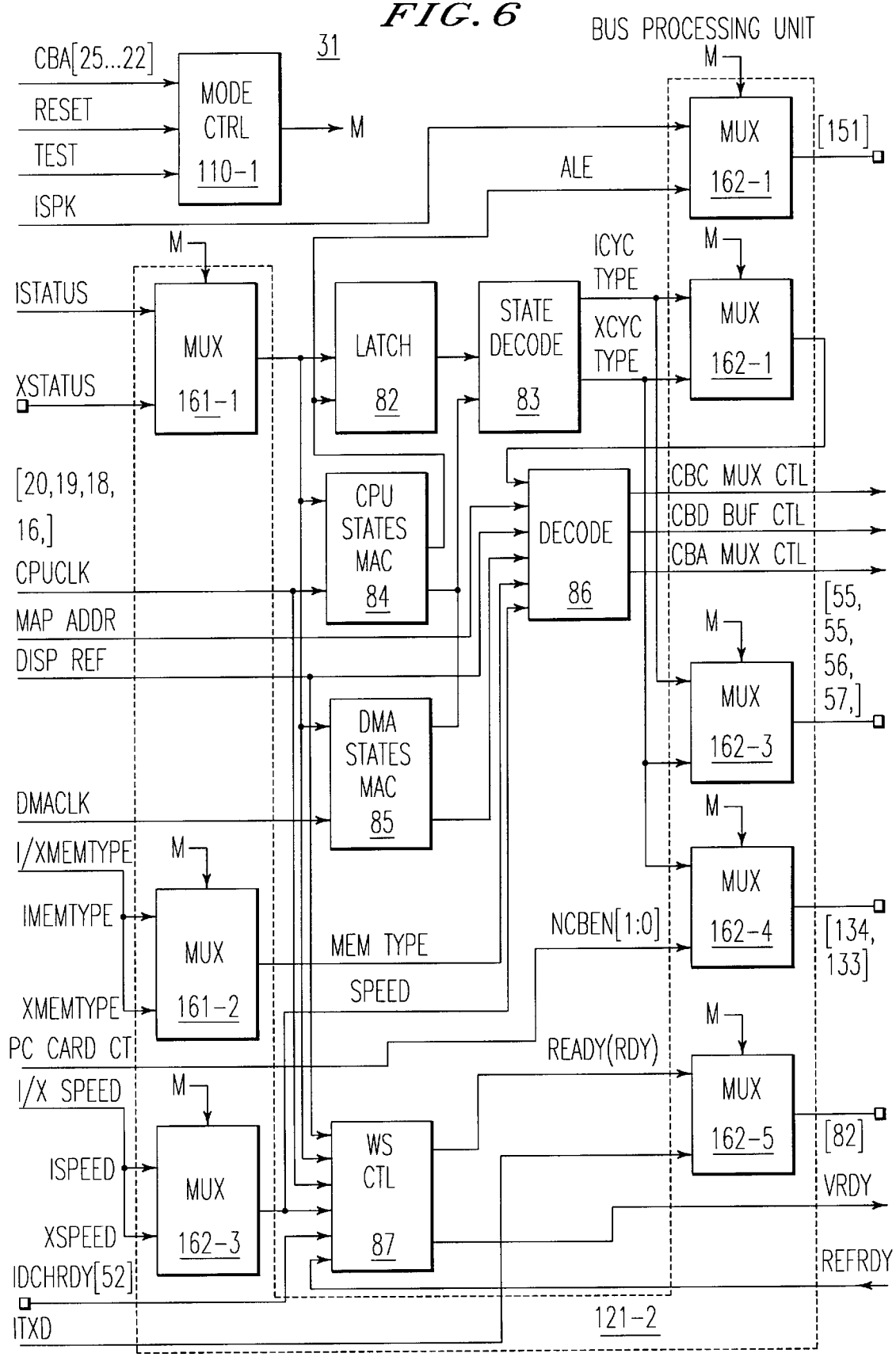

MAPPABLE FUNCTIONS FROM SINGLE CHIP/MULTI-CHIP PROCESSORS FOR COMPUTERS

This application is a continuation of application Ser. No. 08/478,313, filed Jun. 7, 1995 now U.S. Pat. No. 5,671,433, which is a continuation of application Ser. No. 07/947,471, filed Sep. 18, 1992, now abandoned.

BACKGROUND OF THE INVENTION

The present invention relates to the field of computer systems and more particularly to computer chips used in computer systems.

Typical small computer systems have a central processing unit (CPU), main storage, a display, and various input/output (I/O)) devices (such as a keyboard, a printer and disk memory) connected together by buses. I/O devices typically connect to an I/O bus through device controllers such as a display controller, a disk controller and, when direct memory access (DMA) is employed, a DMA controller.

Computer systems, both small and large, are controlled by software in various forms. The operating system (OS) software functions as the interface between application program software and the computer hardware. In small systems, the software for controlling I/O devices is known as the basic input/output system (BIOS).

The BIOS typically includes self-test routines, device-handling routines, and system-service routines. The self-test routines are executed to ensure reliable operation of the system. The device handling routines control the operation of input/output devices. The system service routines provide program loading, memory size determination, equipment determination, time-of-day clock, screen function, and other system services.

Communication between the central processing unit and an I/O device typically involves execution by the central processing unit of an I/O instruction. Each I/O instruction is decoded to initiate read or write operations with an I/O device.

Computer systems, both small and large, have bus architectures that depend upon physical attributes such as board size, connector type, arbitration methods, synchronization protocols, transfer protocols, semiconductor technologies, and power and performance requirements.

One conventional small system is represented by Advanced Micro Devices' (AMD) AM286LX Integrated Processor which employs a conventional architecture having three separate buses. The IBM PC XT/AT architecture is another conventional multibus design based on maximizing system performance without regard to size or power requirements.

As the designs of computers evolve, smaller and smaller unit sizes are resulting. A conventional approach to reducing the size of a computer system is to integrate the computer using a chip set comprised of a small number of semiconductor chips or, when possible, a single semiconductor chip. Presently, a microprocessor can be integrated with other system components on a single chip but technology has not progressed to the level of integration that permits an entire PC computer to be economically integrated using a single semiconductor chip.

Irrespective of the level of integration, in order for functions within chips to be useful, off-chip access to those functions must be provided through I/O pins. Therefore, as the level of integration increases, the number of pins on a semiconductor chip can be expected to increase also.

In order to significantly reduce the size of systems, however, the number of I/O pins needs to be reduced notwithstanding the increased level of integration. Furthermore, these changes decreased pins and increased integration) should be accomplished without degrading functionality or without significantly impacting system performance.

When there is a decreased number of I/O pins together with increased integration on a chip, the ability to test functions on that chip is decreased because of the decreased ability to access locations internal to the chip through I/O pins. Accordingly, there is a need for a mechanism that increases internal access within the chip, at certain times, while avoiding such access at other times.

In accordance with the above background, there is a need for an improved chip architecture which permits selective mapping to internal locations of integrated chips.

SUMMARY OF THE INVENTION

The present invention is a distributed computer system comprising a plurality of engines where each engine is useable to form a separate, integrated computer system. The distributed computer system is the functional equivalent of the separate, integrated computer system.

In the present invention, a computer chip has mappable input/output pins that provide selective and mappable access to internal chip locations. A mapper is provided on the chip for mapping the I/O pins.

One or more chips with mappable pins are employed to form a computer engine. Each computer engine includes a number of internal functional blocks which collectively, together with external units, form a computer system. For small systems, the computer is formed using a single-chip engine. Each chip includes a mapper for mapping the I/O pins whereby different configurations of computer systems can be obtained.

Each engine is associated with an external unit to form an integrated system. Each engine includes one or more chips having a plurality of functional circuits for performing a plurality of functions. Each engine includes a plurality of internal connections on the chips for interconnecting the functional circuits to an associated external unit through I/O pins. Each engine selects, in a first mode for an integrated system, the connection of a first set of internal connections to the I/O pins for operation with a first set of functions. Each engine selects, in a second mode for a distributed system, the connection of a second set of internal connections to the I/O pins for operation with a second set of the functions. The distributed system controls the selection of two or more engines for operation in the second mode to select a second set of functions from each of the two or more engines to form a distributed combination of functions wherein the distributed combination of functions is substantially the same as the first set of functions from one engine.

In the present invention, a computer chip has mappable input/output pins that provide selective and mappable access to internal chip locations. A mapper is provided on the chip for mapping the I/O pins.

One or more chips with mappable pins are employed to form a computer engine. Each computer engine includes a number of internal functional blocks which collectively, together with external units, form a computer system. For small systems, the computer is formed using a single-chip engine. Each chip includes a mapper for mapping the I/O pins whereby different configurations of computer systems can be obtained.

In an example in which a plurality of single-chip engines are provided to form a plurality of integrated computer systems, each single-chip engine includes mappable I/O pins that are mapped with one map configuration to form a integrated computer system. Each such integrated system with one single-chip engine has the I/O pins for that engine mapped to one or more external units. In another example, the same plurality of single-chip engines have I/O pins mapped to another map configuration to form a distributed, multi-chip single computer system. In that distributed system, the plurality of single-chip engines are each mapped differently and connected together so as to function as a single, multi-chip engine. The distributed, multi-chip engine is connected to one or more external units associated with that multi-chip engine to form a computer system that is functionally equivalent to one of the computer systems formed with the single-chip engine.

In the distributed system with two or more engines, more I/O pins are available to access internal locations in the chips than are available with a single engine configuration. Accordingly, testing and detection of functional operations is more readily performed with the multi-chip distributed engine than with the single-chip single engine system. The functions of the single-chip single engine system and the multi-chip distributed engine are identical when suitable I/O pin mapping is selected. Therefore any functional error for the multi-chip distributed engine can expect to have a corresponding functional error for the single-chip single engine.

The multi-chip distribute engine therefore serves as a convenient tool for functional testing of the single-chip engine. The single-chip engine, because of the fewer I/O pins, is more difficult to test than the functionally equivalent multi-chip distributed engine.

The functional testing of the engines is typically performed with any conventional functional tester that is connected over a tester interface connected through the I/O pins to the multi-chip distributed engines. In some testing, the CPU's on each of the engines are disabled and CPU functions are performed with an external In-Circuit Emulator (ICE) Unit that executes conventional functional tests.

The foregoing and other objects, features and advantages of the invention will be apparent from the following detailed description in conjunction with the drawings.

BRIEF DESCRIPTION OF THE DRAWINGS

FIG. 6 depicts a schematic block diagram of the bus processing unit which is one of the functional blocks of the computer engine of FIG. 5.

DETAILED DESCRIPTION

Figure 1:
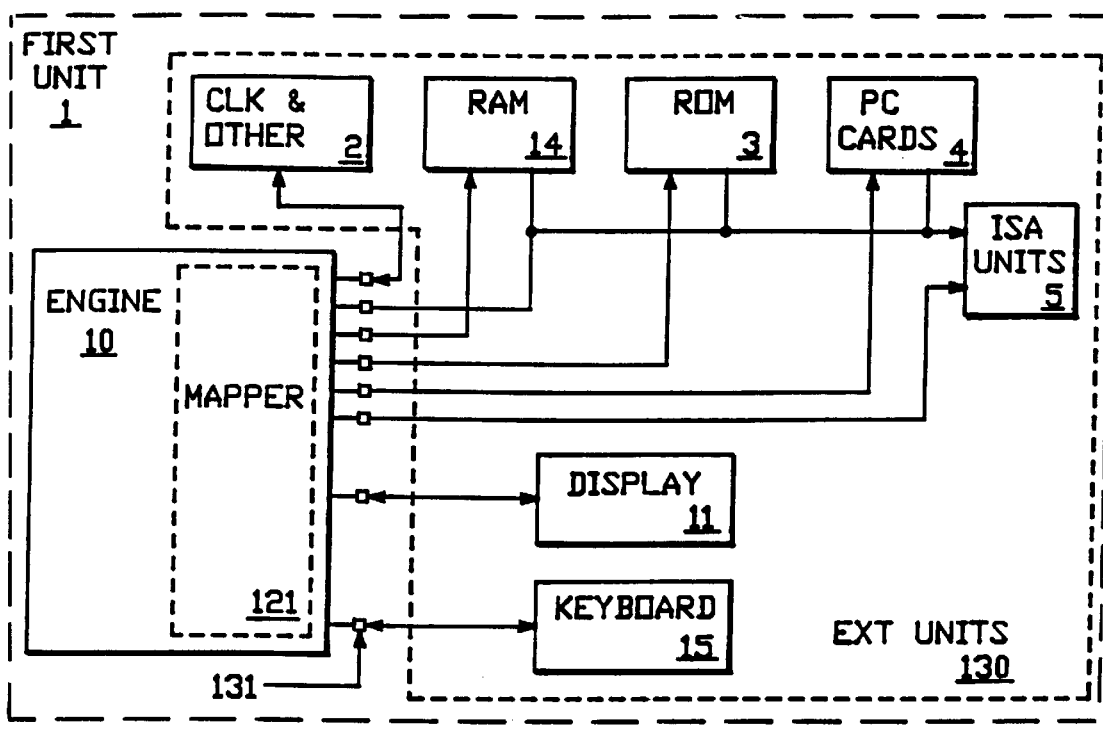
FIG. 1 is a block diagram of a first unit that forms one integrated computer system formed using a computer engine on a single semiconductor chip.

First Unit—FIG. 1

In FIG. 1, a block diagram of a first unit 1 is shown. The first unit 1 of FIG. 1 is typically a computer system suitable for implementation, for example, as a "palm-top" computer using one or more semi-conductor chips.

In FIG. 1, the unit 1 computer system includes an engine 10 typically fabricated on one semiconductor chip and having a number of external connection pins (I/O) 131. The pins 131 connect the engine 10 to the external units 130. The external units 130 include a clock and other units 2, random access memory (RAM) 14, read-only memory (ROM) 3, PC cards 4, ISA units 5, display 11 and keyboard 15.

The FIG. 1 unit 1 is an integrated, highly-discrete computer system with a large number of functions on a single chip for engine 10. The full details of a typical computer system of the FIG. 1 type are described in the above-identified cross-referenced application. While the cross-referenced application describes a small computer system such as a "palm-top" computer in which the engine is implemented on a single semi-conductor chip, the present invention is suitable for any size system including systems with one or more semi-conductor chips.

Figure 2:
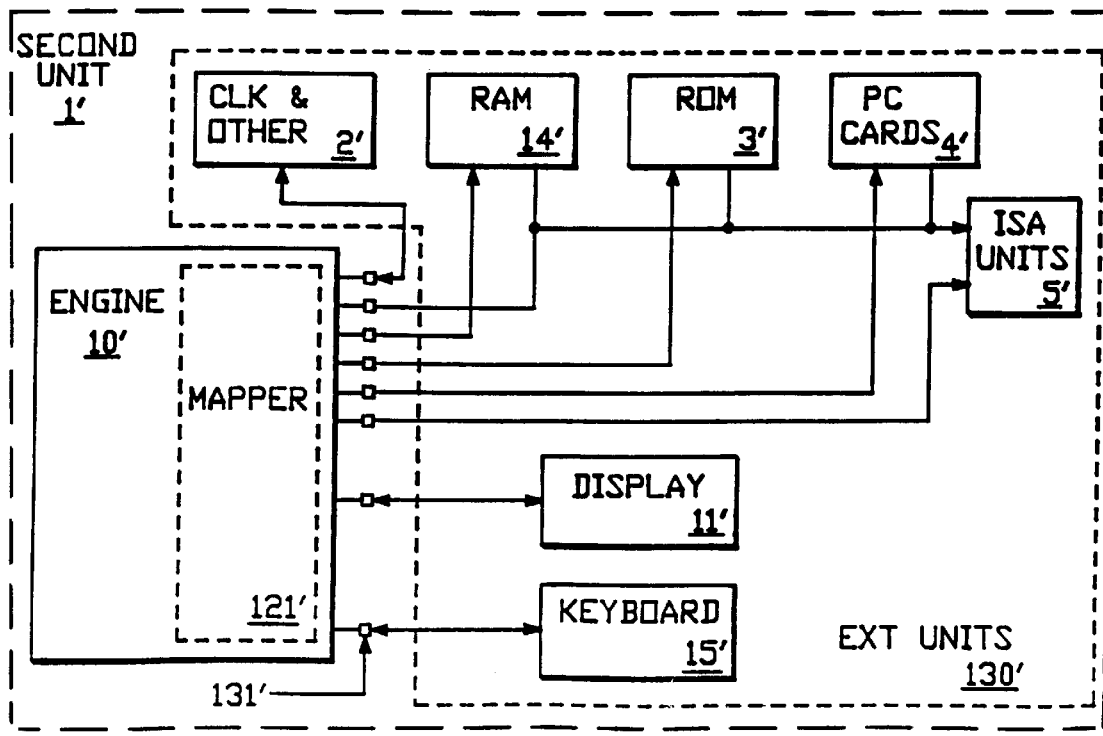
FIG. 2 is a block diagram of a second unit that forms another integrated computer system using a single semiconductor chip, like the FIG. 1 computer system.

Second Unit—FIG. 2

In FIG. 2, the second unit 1' is a computer system substantially identical to the computer system of FIG. 1. In FIG. 2, the same reference numerals for the FIG. 1 system apply in FIG. 2 where corresponding element numbers have a "'". Specifically, engine 10' connects via external pin connections 131' to the external units 130'. Accordingly, the FIG. 2 computer system is a complete computer system independent of the FIG. 1 computer system.

Both the FIG. 1 and the FIG. 2 computer systems include mapper units 121 and 121' which function internally in the engine 10 and the engine 10', respectively, to map the output pins 131 and 131', respectively. In FIGS. 1 and 2, the mappers 121 and 121' map the output pins 131 and 131', respectively, to cause the first and second units 1 and 1', respectively, to function as integrated and independent computer systems. Typically each of the units 1 and 1' is highly integrated and each employs a single-chip engine of the type described in the cross-reference applications.

Figure 3:
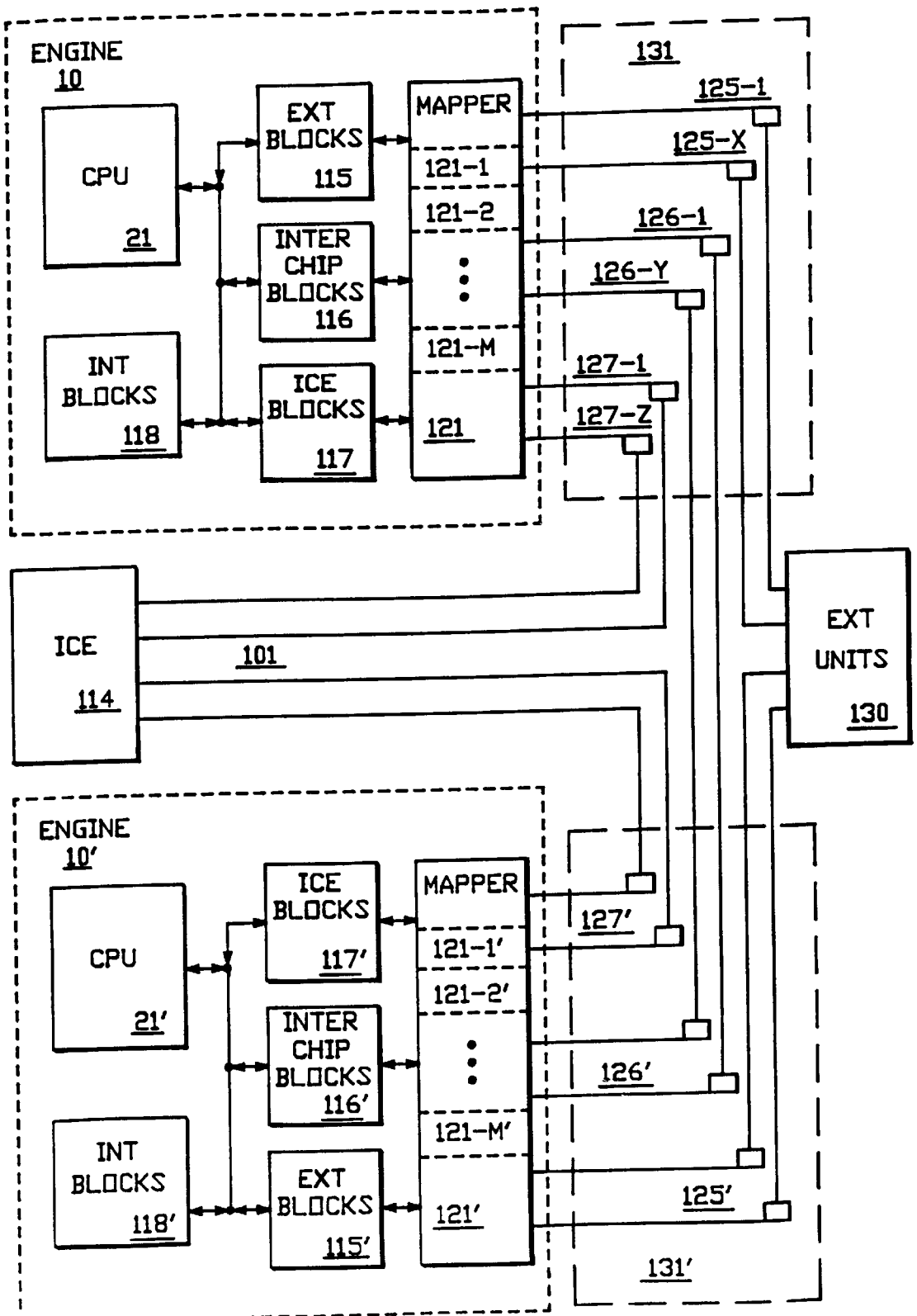
FIG. 3 is a block diagram of a distributed computer system formed by combining portions of the FIG. 1 computer system and portions of the FIG. 2 computer system.

Combined Unit—FIG. 3

In FIG. 3, portions of the engine 10 from the first unit 1 of FIG. 1 and the engine 10' from the second unit 1' of FIG. 2 are selected to form a combined system 101 which functionally is like each of the FIG. 1 and FIG. 2 computer systems. The combined system 101 of FIG. 3 is a distributed system in that it employs portions of two single-chip engines to form a two-chip distributed engine. A single set of external units 130, identical to the external units 130 of FIG. 1, for example, are provided in the FIG. 3 distributed system.

In FIG. 3, some of the single-chip functions of each of the engines 10 and 10' are enabled and some are disabled. Some of the disabled functions of the engine 10 are allocated to the engine 10' and some of the disabled functions in engine 10' are allocated to engine 10. Central Processing Unit (CPU) functions for the combined system 101 are provided in the in-circuit emulator (ICE) 114 and, generally, CPU functions are disabled in the engines 10 and 10'. The ICE unit 114 together with the combined engines 10 and 10' in FIG. 3 provide the functionality of each of the FIG. 1 and FIG. 2 integrated computer systems. By distributing the functionality of a single-chip engine (such as single-chip engine 10 in the FIG. 1 system) over two or more single-chip engines (engine 10 and 10' in FIG. 3) and an external emulator (ICE 114 in FIG. 3) a completely functional distributed computer system 101 is provided in FIG. 3. Such a distributed computer system provides the benefit that internal signals for a single-engine chip that are not normally available on external pins in an integrated computer system (like the computer system of FIG. 1 or FIG. 2) are made available on the remapped external pins 131 and 131' of FIG. 3.

In the FIG. 3 two-chip distributed system embodiment, two times as many external pins (pins 130 and 130') are available compared with the number of pins for the integrated computer system of FIG. 1 or of FIG. 2 (pins 130 or the pins 130').

In order to make the normally internal signals available on output pins, the mappers 121 and 121' in the engines 10 and 10', respectively, are controlled to remap the signals to the output pins for each chip in the FIG. 3 embodiment.

The remapability of the output pins of the chips in the computer systems of FIG. 1 and FIG. 2 enables the distribution of chip functions in FIG. 3 from one chip to multiple chips.

The advantage of being able to remap the output pins is important, for example, when a new chip design has been made but has not been fully tested. Without the capability of remapping the output pins, it is often difficult or impossible to debug and test the functionality of a new chip because internal signals important in determining the operation of the chip are not available for testing.

Also, in some environments, it is desireable to be able to remap circuit connections in a chip to change the functionality of the chip when certain internal components have failed or when different options are to be selected.

In FIG. 3, the engine 10 is organized into a central processing unit 21, internal blocks 118, external blocks 115, interchip blocks 116, ICE blocks 117 and mapper 121. Mapper 121, maps connections from blocks 115, 116, and 117 to the external connection pins 131.

In the engine 10, the internal (INT) blocks 118 represent the circuitry which produces internal signals that are not connected externally. The external (EXT) blocks 115 represent the circuits which are connected by mapper 121 to the external units 130. The interchip blocks 116 represent the circuitry which is connected by the mapper 121 to the engine 10'. The ICE blocks 117 represent the circuits for connecting the CPU functions to the ICE unit 114.

In FIG. 3 the external pins 131 for the engine 10 are organized for convenience in three categories. The first category includes the external-unit pins 125, including pins 125-1, . . . , 125-X which are pins which are connected by the mapper 121 to the external units 130.

The second category of pins are the interchip pins 126, including pins 126-1, . . . , 126-Y. The interchip pins 126-1, . . . 126-Y from engine 10 connect to the interchip pins 126' from the engine 10'. The interchip blocks 116 of engine 10 are interconnected with the interchip blocks 116' through the interchip pins 126 and 126'.

In FIG. 3, the external pins 131 for the engine 10 include the ICE pins 127, including pins 127-1, . . . , 127-Z. These pins 127 connect to the ICE unit 114.

In FIG. 3 in a similar manner, engine 10' includes the external pins 131'. The pins 131' include the ICE pins 127', including pins 127'-1, . . . , 127'-Z. Similarly, the interchip pins 126' include the pins 126'-1 , . . . , 126'-Y. The pins 131' also include the external-unit pins 125' which connect to the external units 130 and include pins 125'-1, . . . , 125'-X.

In the engine 10', the external blocks 115' connect through the mapper 121' and pins 125' to the external units 130. The interchip blocks 116' connect through the mapper 121' and the pins 126' to the pins 126 associated with the engine 10. The ICE blocks 117' connect by mapper 121' and pins 127' to the ICE unit 114. The internal blocks 118' represent circuitry in the engine 10' that has no external connections.

In FIG. 3, the central processing units 21 and 21' are typically disabled in both engine 10 and engine 10'. The disabled CPU functions are distributed off-chip to the ICE block 114. The CPU functions are distributed by remapping the ICE blocks 117 and 117' of engines 10 and 10' through the mappers 121 and 121' to the external ICE unit 114 through the ICE pins 127 and 127'.

The operation of the FIG. 3 combination is to have the in-circuit emulator 114 function as the central processing unit for the combined system 101 of FIG. 3. For such ICE operation, the CPU 21 in the engine 10 and the CPU 21' in the engine 10' are both disabled.

In order to switch between integrated, single-chip operation and distributed two-chip operation the I/O pins are mapped by the mappers 121 and 121' in the FIGS. 1, 2, and 3 systems. In one particular embodiment, the chips are embodied in 160 QUAD FLAT PACKAGE (QFP) structures that each have a total of 144 I/O pins.

The pin assignments for the various embodiments and the mapping that occurs is indicated in the following Table 1. In Table 1, for a single-chip embodiment, the column entitled "INTEGRATED UNIT" defines the mapping for the I/O pins for a "SINGLE UNIT" computer system like FIG. 1. In Table 1, for a two-chip embodiment, the column entitled "COMBINED UNIT" defines the mapping for the I/O pins for each of the two chips. The column "FIRST UNIT" defines the pin assignments for a first one of the chips and the column "SECOND UNIT" defines the pin assignments for a second one of the chips.

The Table 1 symbols I, 0, *, #, [], @, +, % are as follows:

I: Input from test buffer.

O: Output to test buffer.

*: I/O buffer used normal input only.

: I/O buffer used normal output only.

@: Multi-chip mode has same function as single-chip mode.

+: In multi-chip mode, used for CPU interface.

%: In multi-chip mode, used for between chip interface function.

NC: No Connection

TABLE 1

| | INTEGRATED UNIT | | | COMBINED UNIT | | | | |
| --- | --- | --- | --- | --- | --- | --- | --- | --- |
| | SINGLE UNIT | | | FIRST UNIT | | | SECOND UNIT | |
| PIN# | CFG | UNIT | TYPE | TYPE | CFG_ICE1 | | TYPE | CFG_ICE2 | |

| PIN# | CFG | UNIT | TYPE | TYPE | CFG_ICE1 | | TYPE | CFG_ICE2 | |
| --- | --- | --- | --- | --- | --- | --- | --- | --- | --- |
| | | CBD - (COMMON BUS DATA) | | | | | | | |
| 20 | [D15] | I | I/O | I/O | D15 | @ | I | BS2 | + |
| 19 | [D14] | I | I/O | I/O | D14 | @ | I | BS1 | + |
| 18 | [D13] | I | I/O | I/O | D13 | @ | I | BS0 | + |
| 17 | [D12] | I | I/O | I/O | D12 | @ | I | CPUCLK | + |
| 16 | [D11] | I | I/O | I/O | D11 | @ | I | BHEB | + |
| 15 | [D10] | I | I/O | I/O | D10 | @ | I | ISAO | % |
| 14 | [D9] | I | I/O | I/O | D9 | @ | I | FT2B | % |
| 13 | [D8] | I | I/O | I/O | D6 | @ | I | FT2DB | % |
| 11 | [D7] | I | I/O | I/O | D7 | @ | I/O | DIO7 | % |
| 10 | [D6] | I | I/O | I/O | D6 | @ | I/O | DIO6 | % |
| 9 | [D5] | I | I/O | I/O | D5 | @ | I/O | DIO5 | % |
| 8 | [D4] | I | I/O | I/O | D4 | @ | I/O | DIO4 | % |
| 7 | [D3] | I | I/O | I/O | D3 | @ | I/O | DIO3 | % |
| 6 | [D2] | I | I/O | I/O | D2 | @ | I/O | DIO2 | % |
| 5 | [D1] | I | I/O | I/O | D1 | @ | I/O | DIO1 | % |
| 4 | [D0] | I | I/O | I/O | D0 | @ | I/O | DIO0 | % |
| | | CBD | | | | | | | |
| | | CBA - (COMMON BUS ACCESS) | | | | | | | |
| 49 | [A25] | I | O | O | A25 | @ | (NC) | | |
| 48 | [A24] | I | O | O | A24 | @ | (NC) | | |
| 47 | [A23] | I | O | O | A23 | @ | (NC) | | |
| 46 | [A22] | I | O | O | A22 | @ | (NC) | | |
| 45 | [A21] | I | O | O | A21 | @ | (NC) | | |
| 44 | [A20] | I | O | O | A20 | @ | (NC) | | |
| 43 | [A19] | I | O | O | A19 | @ | I | PPA19 | + |
| 42 | [A18] | I | O | O | A18 | @ | I | PPA18 | + |
| 41 | [A17] | I | O | O | A17 | @ | I | PPA17 | + |
| 40 | [A16] | I | O | O | A18 | @ | I | PPA16 | + |
| 38 | [A15] | I | O | O | A15 | @ | I | IAD15 | + |
| 37 | [A14] | I | O | O | A14 | @ | I | IAD14 | + |
| 36 | [A13] | I | O | O | A13 | @ | I | IAD13 | + |
| 35 | [A12] | I | O | O | A12 | @ | I | IAD12 | + |
| 34 | [A11] | I | O | O | A11 | @ | I | IAD11 | + |
| 33 | [A10] | I | O | O | A10 | @ | I | IAD10 | + |
| 32 | [A9] | I | O | O | A9 | @ | I | IAD9 | + |
| 31 | [A8] | I | O | O | A8 | @ | I | IAD8 | + |
| 29 | [A7] | I | O | O | A7 | @ | I | IAD7 | + |
| 28 | [A6] | I | O | O | A6 | @ | I | IAD6 | + |
| 27 | [A5] | I | O | O | A5 | @ | I | IAD5 | + |
| 26 | [A4] | I | O | O | A4 | @ | I | IAD4 | + |
| 25 | [A3] | I | O | O | A3 | @ | I | IAD3 | + |
| 24 | [A2] | I | O | O | A2 | @ | I | IAD2 | + |
| 23 | [A1] | I | O | O | A1 | @ | I | IAD1 | + |
| 22 | [A0] | I | O | O | A0 | @ | I | IAD0 | + |
| | | CBA | | | | | | | |
| | | CLK - (CLOCK) | | | | | | | |
| 139 | X1CLK | I | I | I | X1 | @ | I | X1 | @ |
| 140 | X2CLK | I | O | O | X2 | @ | O | X2 | @ |
| | | CLK | | | | | | | |
| | | CBC - (COMMON BUS CONTROL) | | | | | | | |
| 54 | NSIOWR | I | O | O | NSIOWR | @ | I | NSIOWR | % |
| 55 | NSIORD | I | O | O | NSIORD | @ | I | NSIORD | % |
| 56 | NSMWR | I | O | O | NSMWR | @ | I | NSMWR | % |
| 57 | NSMRD | I | O | O | NSMRD | @ | I | NSMRD | % |
| 149 | IRQA | I | I* | I | IRQA | @ | I | SUSPEND | % |
| 150 | IRQB | I | I* | I | IRQB | @ | I | VPCRD | % |
| 58 | DRQ | I | I* | I | DRQ | @ | I | CLKIHZ | % |
| 59 | NDACK | I | O | O | NDACK | @ | (NC) | | |
| 53 | TC | I | O | O | TC | @ | (NC) | | |
| 51 | AEN | I | O | O | AEN | @ | I | AEN | % |
| 52 | IOCHRDY | I | I* | I | IOCHRDY | @ | I | ALE | % |
| 83 | TEST | I | I* | I | TEST | @ | I | TEST | @ |
| | | CBC | | | | | | | |
| | | RESET | | | | | | | |
| 75 | NRESOUT | I | O | O | NRESOUT | @ | (NC) | | |
| | | RESET | | | | | | | |
| | | KBD - (KEYBOARD) | | | | | | | |
| 121 | SCAN7 | I | O | I/O | AD0 | + | O | SCAN7 | @ |
| 122 | SCAN6 | I | O | I/O | AD1 | + | O | SCAN6 | @ |
| 123 | SCAN5 | I | O | I/O | AD2 | + | O | SCAN5 | @ |
| 124 | SCAN4 | I | O | I/O | AD3 | + | O | SCAN4 | @ |
| 125 | SCAN3 | I | O | I/O | AD4 | + | O | SCAN3 | @ |

TABLE 1-continued

| | | INTEGRATED UNIT | | COMBINED UNIT | | | | |
|---|---|---|---|---|---|---|---|---|
| | | SINGLE UNIT | | FIRST UNIT | | | SECOND UNIT | |
| PIN# | CFG | UNIT | TYPE | TYPE | CFG_ICE1 | | TYPE | CFG_ICE2 |
| 126 | SCAN2 | I | O | I/O | AD5 | + | O | SCAN2 | @ |
| 127 | SCAN1 | I | O | I/O | AD6 | + | O | SCAN1 | @ |
| 128 | SCAN0 | I | O | I/O | AD7 | + | O | SCAN0 | @ |
| 101 | RET11 | I | I/O | I/O | AD11 | + | I | RET11 | @ |
| 102 | RET10 | I | I/O | I/O | AD10 | + | I | RET10 | @ |
| 103 | RET9 | I | I/O | I/O | AD9 | + | I | RET9 | @ |
| 104 | RET8 | I | I/O | I/O | AD8 | + | I | RET8 | @ |
| 105 | RET7 | I | I | I/O | AD15 | + | I | RET7 | @ |
| 106 | RET6 | I | I | I/O | AD14 | + | I | RET6 | @ |
| 107 | RET5 | I | I | I/O | AD13 | + | I | RET5 | @ |
| 108 | RET4 | I | I | I/O | AD12 | + | I | RET4 | @ |
| 110 | RET3 | I | I | O | CPUCLK | + | I | RET3 | @ |
| 111 | RET2 | I | I* | I | IRQ1 | % | I | RET2 | @ |
| 112 | RET1 | I | I* | I | KBDNMI | % | I | RET1 | @ |
| 113 | RET0 | I | I* | I | PPA19 | + | I | RET0 | @ |
| 114 | SHFT4 | I | I* | I | PPA18 | + | I | SHFT4 | @ |
| 115 | SHFT3 | I | I* | I | PPA17 | + | I | SHFT3 | @ |
| 116 | SHFT2 | I | I* | I | PPA16 | + | I | SHFT2 | @ |
| 117 | SHFT1 | I | I | O | NMI | + | I | SHFT1 | @ |
| 118 | SHFT0 | I | I | O | INTR | + | I | SHFT0 | @ |
| | | KBD | | | | | | | |
| | | ROM CTL (READ ONLY MEMORY CONTROL) | | | | | | | |
| 60 | NROMCE0 | I | O# | O | NROMCE0 | @ | (NC) | | |
| 61 | NROMCE1 | I | O# | O | NROMCE1 | @ | (NC) | | |
| | | ROM CTL | | | | | | | |
| | | RAM CTL (RANDOM ACCESS MEMORY) | | | | | | | |
| 2 | NMC9 | I | O# | O | NMC9 | @ | (NC) | | |
| 1 | NMC8 | I | O# | O | NMC8 | @ | (NC) | | |
| 160 | NMC7 | I | O# | O | NMC7 | @ | (NC) | | |
| 159 | NMC6 | I | O# | O | NMC6 | @ | (NC) | | |
| 158 | NMC5 | I | O# | O | NMC5 | @ | (NC) | | |
| 157 | NMC4 | I | O# | O | NMC4 | @ | (NC) | | |
| 158 | NMC3 | I | O# | O | NMC3 | @ | (NC) | | |
| 155 | NMC2 | I | O# | O | NMC2 | @ | (NC) | | |
| 154 | NMC1 | I | O# | O | NMC1 | @ | (NC) | | |
| 153 | NMC0 | I | O# | O | NMC0 | @ | (NC) | | |
| | | RAM CTL | | | | | | | |
| | | PC CARD CTL & STATUS | | | | | | | |
| 120 | ROM8_16 | I | I* | I | ROM8_16 | @ | (NC) | | |
| 137 | NREGA | I | O# | O | SUSPEND | % | O | NREGA | @ |
| 132 | NCE2A | I | O# | O | RESB | % | O | NCE2A | @ |
| 131 | NCE1A | I | O# | O | TOUT2 | % | O | NCE1A | @ |
| 148 | RDY_NBSYA | I | I* | I | PCCIOWAITB | % | I | RDY_NBSYA | @ |
| 147 | WPA | I | I* | I | PCCSIRQ | % | I | WPA | @ |
| 136 | NCD2A | I | I* | I | PCCAIRQ | % | I | NCD2A | @ |
| 135 | NCD1A | I | I* | I | PCCIOACB | % | I | NCD1A | @ |
| 145 | BVD1A | I | I* | I | PCC_IOIS16B | % | I | BVD1A | @ |
| 146 | BVD2A | I | I* | I | PCCIO8BIT | % | I | BVD2A | @ |
| 129 | NVPPEN1A | I | O# | O | VPCRD | % | O | NVPPEN1A | @ |
| 130 | NVPPEN2A | I | O# | O | CLK1HZ | % | O | NVPPEN2A | @ |
| 143 | NWAITA | I | I* | I | PCCME | % | I | NWAITA | @ |
| 142 | NINPACKA | I | I* | I | SIOIRQ | % | I | NINPACKA | @ |
| 134 | NCBEN1 | I | O# | O | FT2B | % | O | NCBEN1 | @ |
| 133 | NCBEN0 | I | O# | O | FT2DB | % | O | NCBEN0 | @ |
| 144 | CDIR | I | O# | O | CLK256HZ | % | O | CDIR | @ |
| | | PC CARD CTL & STATUS | | | | | | | |
| | | DISP CLK (DISPLAY CLOCK) | | | | | | | |
| 99 | SHCLK | I | O# | O | SHCLK | @ | O | PCC_NMI | % |
| 87 | LOCLK | I | O# | O | LOCLK | @ | O | PCCIOWAITB | % |
| 92 | FRAME | I | O# | O | FRAME | @ | O | PCCMEMWAITB | % |
| 94 | M | I | O# | O | M | @ | O | PCCAIRQ | % |
| | | DISP CLK | | | | | | | |
| | | DISP DATA (DISPLAY DATA) | | | | | | | |
| 98 | LCDW | I | O# | O | LCDU3 | @ | O | PCC_IOACCB | % |
| 97 | LCDU2 | I | O# | O | LCDU2 | @ | O | PCC_IOIS16B | % |
| 98 | LCDU1 | I | O# | O | LCDU1 | @ | O | PCC_IO8BIT | % |
| 96 | LCDU0 | I | O# | O | LCDU0 | @ | O | SIOIRQ | % |
| 91 | LCDL3 | I | O# | O | LCDL3 | @ | O | IRQ1 | % |
| 90 | LCDL2 | I | O# | O | LCDL2 | @ | O | KBDNMI | % |
| 89 | LCDL1 | I | O# | O | LCDL1 | @ | O | PCCBIRQ | % |
| 88 | LCDL0 | I | O# | O | LCDL0 | @ | (NC) | | |
| | | DISP DATA | | | | | | | |
| | | SIO (SERIAL I/O) | | | | | | | |

TABLE 1-continued

| | INTEGRATED UNIT | | | COMBINED UNIT | | | | |
| --- | --- | --- | --- | --- | --- | --- | --- | --- |
| | SINGLE UNIT | | | FIRST UNIT | | | SECOND UNIT | |
| PIN# | CFG | UNIT | TYPE | TYPE | CFG_ICE1 | | TYPE | CFG_ICE2 | |
| 85 | SIOX1 | I | I | (NC) | | | I | SIOX1 | @ |
| 84 | SIOX2 | I | O | (NC) | | | O | SIOX2 | @ |
| 82 | TXD | I | O# | O | RDY | + | O | TXD | @ |
| 76 | RXD | I | I | I/O | RQB_GTB | + | I | RXD | @ |
| 81 | NRTS | I | O | I | BS0 | + | O | NRTS | @ |
| 80 | NDTR | I | O | I | BS1 | + | O | NDTR | @ |
| 77 | NCTS | I | I* | I | BS2 | + | I | NCTS | @ |
| 78 | NDSR | I | I* | I | BHEB | + | I | NDSR | @ |
| 79 | NDCD | I | I* | I | PCCBIRQ | % | I | NDCD | @ |
| 63 | NRI | I | I* | I | NRI | @ | I | NRI | @ |
| | | SIO | | | | | | | |
| | | RT CLK (REAL TIME CLOCK) | | | | | | | |
| 73 | CLK32X1 | I | I | I | CLK32X1 | @ | I | CLK32X1 | @ |
| 72 | CLK32X2 | I | O | O | CLK32X2 | @ | O | CLK32X2 | @ |
| | | RT CLK | | | | | | | |
| | | SYS RESET (SYSTEM RESET) | | | | | | | |
| 70 | SYSPWRGD | I | I | I | SYSPWRGD | @ | I | SYSPWRGD | @ |
| 71 | SNEPWRGD | I | I | I | SNEPWRGD | @ | I | SNEPWRGD | @ |
| | | SYS RESET | | | | | | | |
| | | PMU (POWER MAGNETIC UNIT) | | | | | | | |
| 65 | LBPMU | I | I | I | LB | @ | I | TOUT2 | % |
| 68 | VPLCD | I | O# | O | VPLCD | @ | O | IRQ7 | % |
| 69 | VPBIAS | I | O# | O | VPBIAS | @ | (NC) | | |
| 66 | VP_PCCRD | I | O# | O | CMD_BLK | % | O | VP_PCCRD | @ |
| 67 | VPSYS | I | O# | O | VPSYS | @ | (NC) | | |
| 64 | EXT | I | I | I | EXT | @ | I | CLK256HZ | % |
| | | PMU | | | | | | | |
| | | SPEAKER | | | | | | | |
| 151 | SPK | I | O | O | ALE | % | O | SPK | @ |
| | | SPEAKER | | | | | | | |
| | | POWER | | | | | | | |
| 12 | VCC PWR | I | | | | | | | |
| 30 | VCC PWR | I | | | | | | | |
| 62 | VCC PWR | I | | | | | | | |
| 93 | VCC PWR | I | | | | | | | |
| 109 | VCC PWR | I | | | | | | | |
| 141 | VCC PWR | I | | | | | | | |
| 3 | GND PWR | I | | | | | | | |
| 21 | GND PWR | I | | | | | | | |
| 39 | GND PWR | I | | | | | | | |
| 50 | GND PWR | I | | | | | | | |
| 74 | GND PWR | I | | | | | | | |
| 88 | GND PWR | I | | | | | | | |
| 100 | GND PWR | I | | | | | | | |
| 119 | GND PWR | I | | | | | | | |
| 138 | GND PWR | I | | | | | | | |
| 152 | GND PWR | I | | | | | | | |
| | | POWER | | | | | | | |

Figure 4:
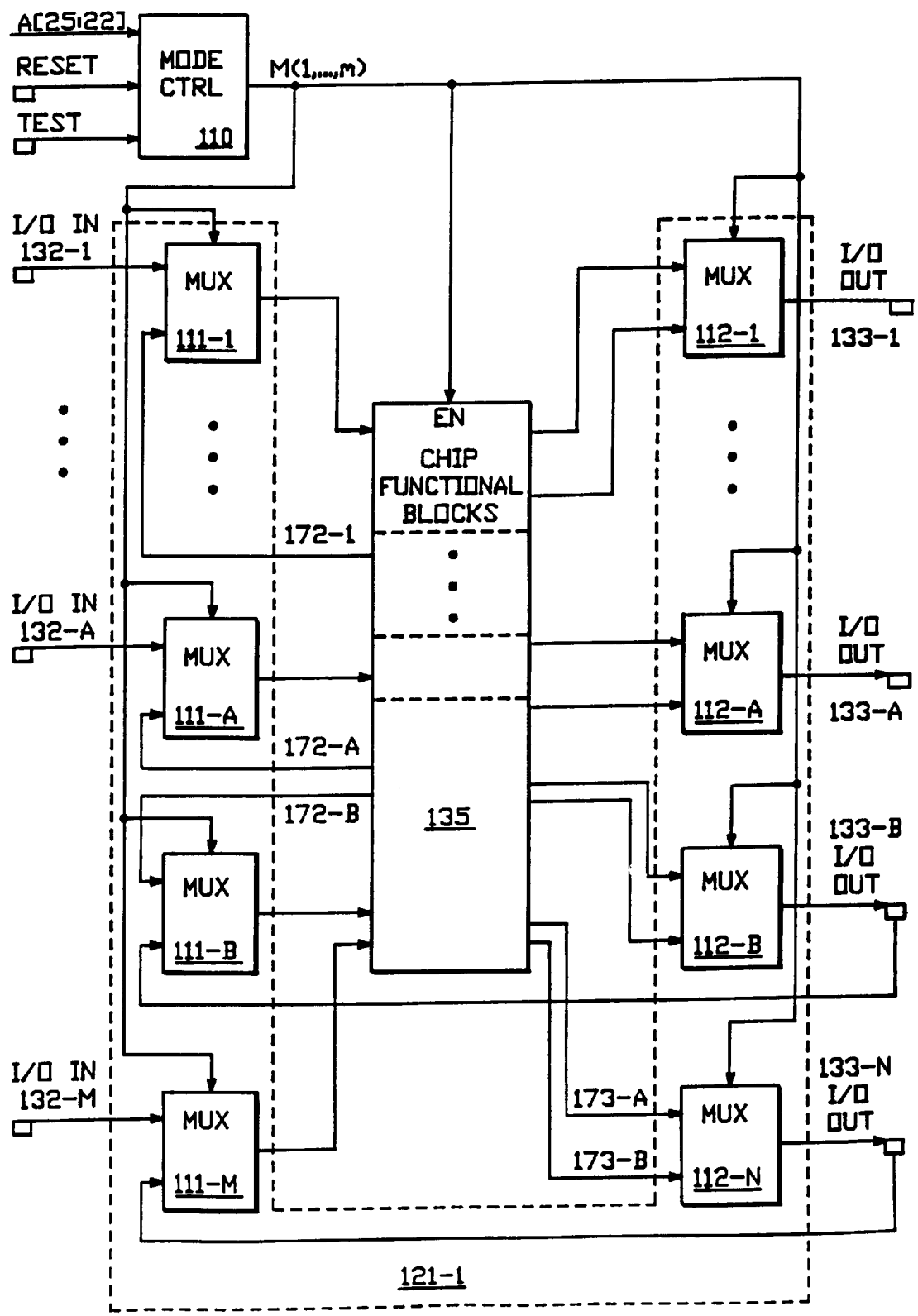
FIG. 4 is a block diagram depicting further details of the mapper units in the FIG. 1, FIG. 2 and FIG. 3 systems.

Mapper Unit—FIG. 4

In FIG. 4, a mapper block 121-1 is shown that is representative of a typical portion of the mapper 121 of FIGS. 1 and 3 which maps the external pins 131. A subset of the external pins 131 of FIGS. 1 and 5 include in FIG. 4 the pins 132 (including pins 132-1, . . . , 132-A, 132-M and the pins 133-1, . . . , 133-A, 133-B, 133-N). In FIG. 4, the mapper 121 connects the external pins 131 (including pins 132 and 133) to the other functional blocks of the engine 10.

FIG. 4 is a generic representation of a representative portion 121-1 of a mapper 121 showing different types of remapping that can occur between the pins 132 and 133 and the functional blocks 135. In general, the pins 132 are connections for connecting the external units 130 (see FIGS. 1 and 3) to the functional blocks 135. Functional blocks 135 in FIG. 4 represent, for example, blocks 115, 117 and 118 in FIGS. 1 and 3. In one example, the pin 132-1 normally receives an external input signal for connection to the functional blocks 135. The mapper 121 connects the pin 132-1 through a multiplexer 111-1. Another input to the multiplexer 111-1 is an internal signal line 172-1. Multiplexer 111-1 under control of one of the M control signals from mode control 110 selects between the pin 132-1 external signal and the line 172-1 internal signal. Similarly, the multiplexer 111-A selects between the external pin 132-A and the internal signal line 172-A under control of one of the M control signals.

A multiplexer 111-B selects between an internal signal line 172-B and the signal on an output pin 133-B. When the signal on the pin is selected, the output 133-B from multiplexer 112-B is disabled so that pin 133-B can receive a signal from an external circuit such as from the pins 131' of engine 10' of FIGS. 2 and 3. The multiplexer 111-M selects between the input pin 132-M and an input on the pin 133-N (assuming the output from multiplexer 112-N is disabled).

The output multiplexers 112 include a multiplexer 112-1. The multiplexer 112-1 selects between two internal signals from the functional blocks 135 and connects them to the output pin 133-1 under control of one of the M control signals. Similarly, the multiplexer 112-A selects between internal signals and connects them to the output pin 133-A under control of one of the M control signals.

In FIG. 4, the multiplexer 112-B, when enabled, connects one of two internal signals to the output pin 133-B under control of a first one of the M control signals. When disabled under control of another of the M control signals, the multiplexer 112-B blocks any output signals allowing the external pin 133-B to connect as an input to the multiplexer 111-B. The multiplexer 112-N selects from internal signals 173-A or 173-B or blocks any output signals so that the pad 133-N can be used as an input. When used as an input, the pad 133-N connects as an input to multiplexer 111-M.

The configurations of multiplexers and signal pins in FIG. 4 represent different types of remapping performed by mapper 121 of FIGS. 1 and 3. In general, the mapper 121 can be configured to remap any of the output signals on pins 133 and any of the input signals on pins 132 in any desired configuration so as to enable, as indicated in connection with FIG. 3, the distributing of functions from one chip (such as in engine 10) to another chip (such as an engine 10'). Because the engine 10 and 10' are complementary (and preferably identical) the functionality necessary for a combined computer system can be distributed between the chips for engine 10 and engine 10'. In this manner, the single-chip engine computer system of FIG. 1 or of FIG. 2 is distributed across two or more chips as shown, for a two-chip embodiment, in FIG. 3.

In FIG. 4, the multiplexers 111 and 112 are controlled by the M control signals from mode control 110. Mode control 110 is set to a particular one of several modes as a result of the RESET and TEST input control signals. For example, in the signal-chip integrated computer mode of FIG. 1 or FIG. 2, the mode control 110 is reset, in response to a RESET input signal, to set the M control signal outputs M(1, . . . , m) to select an integrated computer configuration. Each output from mode control 110 connects as a control input to one or more of the multiplexers 111 or 112. Each multiplexer 111 or 112 either selects one of the other of the inputs as the output or alternatively inhibits any output. Referring to multiplexer 112-N, for example, either input 173-A or input 173-B is selected as the output to pin 133-N as a function of a first M signal (for example, M(1)) being a logical 1 or logical 0, respectively. Multiplexer 112-N additionally functions to inhibit any output to pin 133N when a second M signal (M(2), for example) from mode control 110 is asserted irrespective of the logical 1 or logical 0 of the M(1) signal.

The mode control 110 for the mapper block 121-1 of FIG. 4 receives the four address bits A[25:22]. Mode control 110 includes an internal decoder for decoding the address input and the RESET and TEST inputs to provide the unique M outputs for controlling the mapping multiplexers 111 and 112 of FIG. 4. Each subset 121-1, 121-2, . . . , 121-M of multiplexers, like subset 121-1 of FIG. 4, which are included within the mapper 121 are separately addressable by means of a different decoder in the corresponding mode control to enable any desired remapping of the external pins 131 of FIG. 3.

Figure 5:
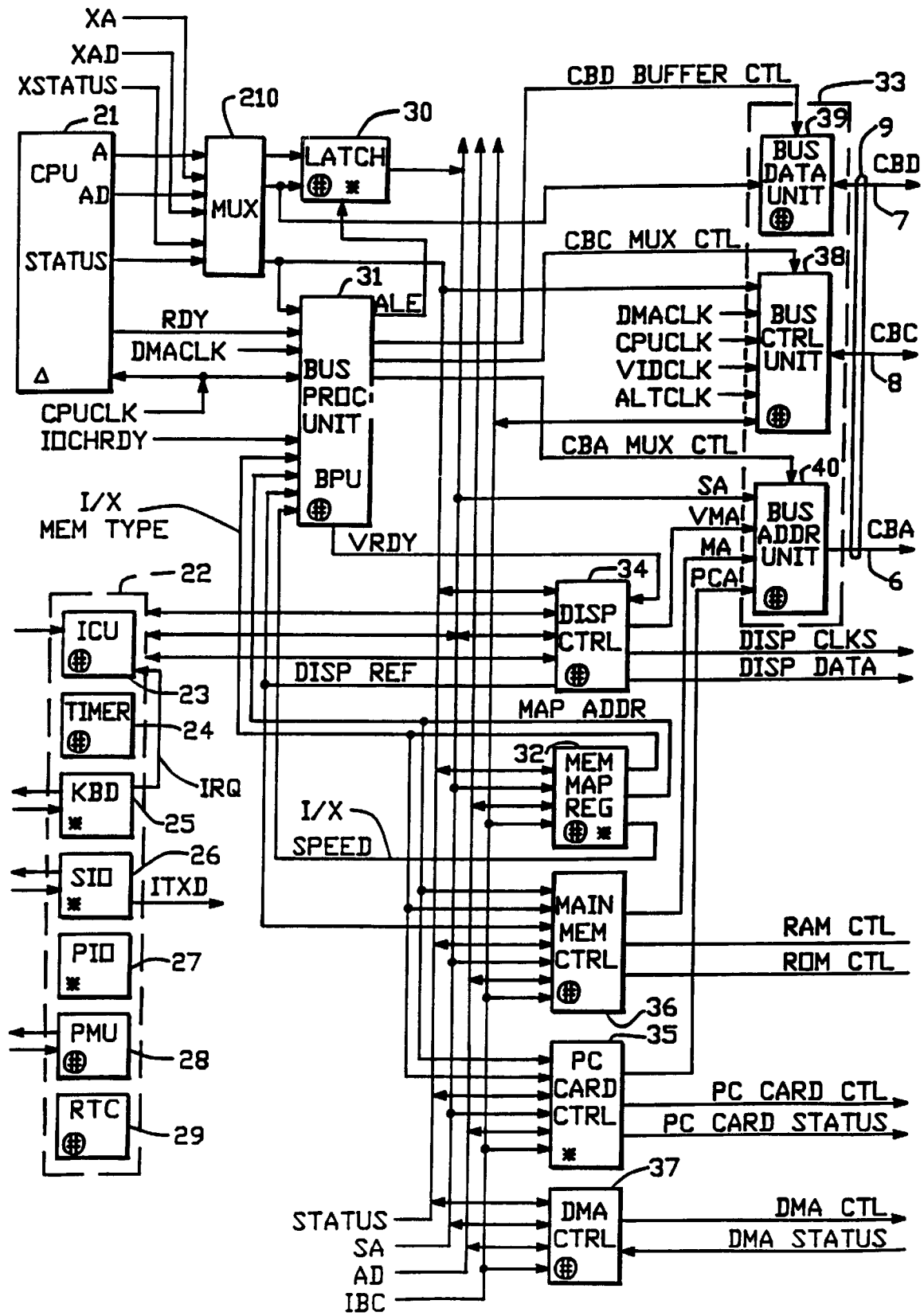
FIG. 5 is a schematic block diagram of the computer engine included in the FIG. 1, FIG. 2 and FIG. 3 computer systems.

Common Bus Engine—FIG. 5

In FIG. 5, further details of the engine 10 of the FIG. 1 system are shown. In FIG. 5, the engine 10 includes a processor (CPU) 21, core unit 22 including conventional logic for PC computers. The core unit 22 includes interrupt request control unit (ICU) 23, a timer (TIMER) 24, a keyboard control (KBD) 25, a serial input/output interface (SIO) 26, a parallel input/output interface (PIO) 27, power management unit (PMU) 28, and a real-time clock (RTC) 29 supporting static RAM for battery backed setup information.

In FIG. 5, the engine 10 also includes display control (DISP CTRL) 34, memory map registers (MEM MAP REG) 32, PC card control (PC CARD CTRL) 35, main memory control (MAIN MEM CTRL) 36, and direct memory access control (DMA CTRL) 37.

In FIG. 5, the common bus 9 is output from the common bus connection unit 33 which includes a bus data unit 39, a bus control (CTRL) unit 38 and a bus address (ADDR) unit 40.

The common address bus (CBA) 6 is derived from the bus address unit 40. The bus address unit 40 is a multiplexer which functions under control of the CBA MUX CTL signal from bus processing unit 31 to select one of the special purpose internal buses, namely, system address bus (SA), video memory address bus (VMA), PC card address bus (PCA), or main memory address bus (MA).

The common data bus (CBD) 7 is derived from the bus data unit 39 of FIG. 5. The bus data unit 39 is a bidirectional buffer which functions under control of the CBD BUFFER CTL signal from bus processing unit 31 to buffer data from or to the data bus (CBD) 7.

The common control bus (CBC) 8 is derived from the bus control unit 38 of FIG. 5. The bus control unit 38 functions under control of the CBC MUX CTL signal from bus processing unit 31 to provide control information to the control bus (CBC) 8.

The clock and other units 2 of FIG. 1 have been shown external to engine 10. Clock and other units 2 can be either internal or external to engine 10 and either way, a plurality of clock and other signals are provided to control different timing within the computer system.

ASIC Implementation

The engine 10 is suitable for implementation as an application-specific integrated circuit (ASIC) that facilitates the FIG. 1 system being constructed as a small footprint computer which is compatible, for example, with the IBM PC/XT architecture. In an IBM PC/XT compatible embodiment, the engine 10 is typically implemented as follows:

Processor 21 is functionally like static versions of conventional CPU's such as Intel 80CXXX processors including 80C88, 80C86, and 80C186 processors.

DMA CTRL 37 is functionally like Intel 8237A PC/XT compatible DMA unit.

ICU 23 is functionally like Intel 8259A PC/XT compatible Interrupt Control Unit.

TIMER 24 is functionally like Intel 8253/8254 PC/XT compatible timer.

KBD 25 is functionally like Intel 8255 compatible PC/XT Keyboard Interface.

SIO 26 is functionally like National Semiconductor NS16450 PC/XT compatible Serial Port.

PIO 27 is functionally like Intel 8255 compatible PC/XT Parallel Port.

RTC 29 is functionally like Motorola MC146818 Real Time Clock supporting Static RAM for battery backed set-up information.

PMU 28 is functionally like Vadem VG-647 Power Management Unit.

MAIN MEM CTRL 36 is functionally like Vadem Core Logic VG-501, VG-502, or VG-330 supporting ROM, DRAM or SRAM.

PC Card CTRL 35 is a controller supporting ROM, RAM, or I/O in a PCMCIA compatible manner.

DISP CTRL 34 is functionally like Vadem VG-600 CGA compatible sub-system supporting CGA and non-CGA resolution LCDs with modifications described hereinafter.

One preferred embodiment of the engine 10 is based upon the components identified above to provide a small computer system compatible with the PC/XT. However, other components can be utilized in the present invention for PC/XT compatibility or for other system compatibility. For example, PC/AT, PC/386 or other components may be selected for the engine 10 if PC/AT, PC/386 or other system compatibility is desired.

For any family of components and functions, in order to reduce the size (footprint) of the computer system, the number of I/O connection pins needs to be reduced as compared with the number of I/O pins for conventional implementations of such computers. When I/O pins are eliminated, the circuitry that normally is connected to the eliminated I/O pins is also eliminated thereby desirably reducing the size of the system even further.

The reduction in I/O pins was achieved for engine 10 of FIG. 1, for example, by eliminating one or more special-purpose buses that exist in conventional small systems and in place thereof a common bus 9 is provided to serve all common bus devices.

Additionally, a video display buffer for servicing display 11 was implemented in the main memory 11. Therefore, since the video display buffer is accessed via the common bus 9, I/O pins and special circuitry for video display was reduced.

The system of FIG. 1 with the above subsystem designs provides the functionality of the PC/XT architecture with a single-chip engine of FIG. 5 capable of having a small footprint (small base area) for the semiconductor chip.

Internal Engine Buses

In FIG. 5, the engine 10 includes a number of internal buses which include an Address (A) bus, an Address/Data (AD) bus and a STATUS bus from processor 21, a System Address (SA) bus from latch 30, a Memory Address (MA) bus from main memory controller 36, a PC Card Address (PCA) bus from PC card controller 35, a Video Memory Address (VMA) bus from display controller 34.

Each internal bus is independently controlled by logic specifically designed for the function of that bus. Bus processing unit 31 determines the type of transfer and the source and destination of the transfer and selects the appropriate inputs and outputs for the common bus 9.

Internal A Bus and AD Bus

The internal multiplexed microprocessor buses (A and AD buses) are analogous to the address and data pins of the Intel 80C86/80C88 family of processors. The A bus and the AD buses are multiplexed and provide address information during the first part of a CPU cycle and then, during the second part of the cycle, the A bus is used to indicate program status and the AD bus is used to transmit or receive data. During CPU cycles, the A bus and AD bus are latched in latch 30 to generate the SA bus.

Internal System Address Bus

The internal system address bus (SA) is driven by one of two sources, either from the processor 21 through latch 30, or by the DMA controller 37. In either case, the SA bus is used to provide addresses for the Memory Address (MA) bus, for the PC Card Address (PCA) bus, or for the Video Memory Address (VMA) bus.

Internal Memory Address Bus

The addresses for the internal memory address bus (MA) are derived in main memory controller 36 from the SA bus.

The main memory controller 36 converts the SA address into one of two formats, a multiplexed Row/Column format for interfacing to DRAM, or a latched address format for SRAM. In both cases, the address driven onto the MA bus is determined by the address present on the SA bus and the contents of the MEM mapping registers 32 pointed to by the SA bus elements SA[14:19].

Internal PC Card Address Bus

The addresses for the internal PC card address bus (PCA) are derived from the SA bus. The PC card controller 35 determines the PCA bus address as a function of the address present on the SA bus and the contents of the MEM mapping registers 32 pointed to by the SA bus elements SA[14:19].

Internal Video Memory Address Bus

The addresses for the internal video memory address bus (VMA) are generated as a result of one of two causes, either processor 21 or DMA controller 37 places a CGA compatible display buffer address on the SA bus, or alternatively the internal display controller 34 has been granted control of the main memory 14 in order to perform display refresh. When the processor 21 or DMA controller 37 attempts access to the CGA display buffer, the display controller 34 translates this address into the physical address in main memory 14 where the video display buffer resides and provides this address onto the VMA bus. Likewise, when the display controller 34 is granted control of main memory 14 to perform display refresh, the display buffer address is output on the VMA bus.

Internal Data Bus

Data is transferred on the internal AD bus from processor 21 to the bus data unit 39 and from there to external memory or I/O via the D[0:7] pins of common data bus 7. These pins are also used during video RAM accesses. Since engine 10 does not contain DMA devices, the D[0:7] pins forming the CBD external data bus 7 are tri-stated by bus data unit 39 during DMA cycles to prevent bus contention between external memory and I/O.

Internal Status Bus

The STATUS bus from processor 21 provides bus control and bus cycle status which is used by bus control unit 38 to determine timing strobes and a clock source for external sub-system devices connected to common bus 9. Timing for control bus 8 is generated either by the processor 21 clock source, CPUCLK, or by an alternate clock source, ALTCLK, specified during engine 10 initialization and derived from clock unit 2 of FIG. 1. The processor 21 clock source, CPUCLK, from clock unit 2 generates the control bus timing strobes and clock during accesses to main memory 14 (RAM), the BIOS ROM 3, or PC cards 4. The selection of these values is controlled by the SPEED values stored in the memory mapping registers 32 of FIG. 8 which are loaded under control of system software.

The alternate clock source, ALTCLK, from clock unit 2, which typically operates at speeds compatible with the ISA bus (4.77 Mhz or 8 Mhz), generates the control bus timing strobes and clock outputs during accesses which occur when the SPEED indicator selects the alternate clock source.

Timing for accesses to the video display are based upon CPUCLK during CPU reads and writes, and the display controller's clock source, VIDCLK, during display refresh cycles.

The STATUS bus, among other things, includes the S0, S1, S2 bits and an AEN bit. The AEN bit is a conventional bit asserted by the DMA controller 37 of FIG. 5 whenever a DMA operation is in control.

Bus Processing Unit (BPU)—FIG. 6

In FIG. 6, the bus processing unit 31 of FIG. 5 is shown as representative of the functional blocks 135 that form the engine 10. The bus processing unit 31 of FIGS. 5 and 6 is like that described in the above-identified cross-referenced application with the addition of the mapper unit 121-2 for mapping inputs and outputs to and from unit 31. Mapper unit 121-2 is that part of the mapper 121 of FIG. 3 that is associated with the bus processing unit 31.

In FIG. 6, each internal address bus (A, AD, SA, MA, PCA, VMA) of the engine 10 is independently controlled by conventional logic in a manner well known for the PC architecture. Examples of such conventional logic are the components identified above in this specification under the "ASIC Implementation" heading.

BPU Integrated' Single-Chip Operation

When single-chip operation has been selected by mode control 110-1, the bus processing unit of FIG. 6 operates in the manner described in the above-identified cross-referenced application as follows.

When the processor (CPU) 21 of FIGS. 3 and 5, or another bus master requests an access to a device that in a conventional system would be accessed over a particular special-purpose bus, addresses for that device are provided to the A[0:25] field of the common bus 9 in engine 10 of FIG. 5.

In FIG. 6, the status on the internal STATUS bus from the processor 21 in FIG. 5 is selected by multiplexer 161-1 and is latched into the status latch 82 during CPU cycles. The CPU cycles are monitored by the CPU STATE machine (MAC) 84 which is clocked by CPUCLK which also clocks processor 21 of FIG. 5

The CPU STATE machine 84 monitors the S0 and S1 bits of internal STATUS (ISTATUS) when AEN is not asserted and upon either S0 or S1 having a negative-going transition, the ALE line is asserted and latches STATUS (S0, S1, S2) into latch 82. At a negative-going transition, one clock cycle after ALE is asserted, STATUS is valid as indicated by a STATEN signal being asserted as described in the cross-referenced application.

The STATEN signal is asserted and remains asserted during DMA cycles by the DMA STATE MAC 85 until internal STATUS changes as indicated by S0 and S1 being 1's.

In FIG. 6, a DMA STATE machine (MAC) 85 monitors DMA cycles and is clocked by DMACLK. State decoder 83 decodes a CPU operation from the status latch 82 or a DMA operation from the DMA state machine 85 and indicates either a DMA or CPU cycle with an internal (ICYC TYPE) CYCLE TYPE signal selected by multiplexer 162-2 to the decoder 86.

In FIG. 6, the DMA STATE MAC 85 senses when the AEN bit from the STATUS bus selected by multiplexer 161-1 is asserted in order to control DMA operations. The asserted AEN bit is present during the entire DMA operation. Whenever AEN is asserted, the STATEN signal is asserted whenever an IORD or an MEMR signal is valid. Decoder 86 receives the CYCLE TYPE signal from multiplexer 161-2 (which selects the internal ICYC TYPE signal from state decoder 83), the DISP REF signal from the DISPY CTRL 34 in FIG. 5, the MEM TYPE signal from multiplexer 161-2 (which selects the internal IMEMTYPE signal) and the MAP ADR signal from the MEM CTRL 32 of FIG. 5. Decoder 86 uses these signals to select the bus control unit 38, bus data unit 39 and bus address unit 40 from the common bus connection unit 33 in FIG. 5. Specifically, decoder 86 provides the CBC MUX CTL signal to bus control unit 38, provides the CBD BUFFER CTL signal to bus data unit 39, and provides the CBA MUX CTL signal to bus address unit 40.

The wait state control (WS CTL) 87 receives the SPEED input from the multiplexer 161-3 (which selects the internal ISPEED signal), I/O channel ready (IOCHRDY), DISP REF, CPUCLK, REFRDY and STATUS (from multiplexer 161-1) inputs and provides the RDY signal to the processor 21 of FIG. 5 to control WAIT states (and to multiplexer 162-5 for output on pin 82) and outputs the VRDY signal to the display control 34 to acknowledge that control of main memory has been released.

The bus processing unit 31 of FIG. 6 decodes the bus CYCLE TYPE from multiplexer 162-2 and MEM TYPE from multiplexer 161-2 to generate control signals used to select the internal address bus and speed classification for the current operation of common bus 9.

The internal address bus selection is made according to the cycle type. Bus operations directed to I/O devices use the internal SA bus. Bus operations directed to memory devices use one of the internal SA, MA, PCA, or VMA buses depending upon the state of the DISP REF and MEM TYPE indicators. While the DISP REF signal is asserted, the other internal address buses are ignored and the VMA bus is selected to drive the A[0:25] address bits on bus 9. While the DISP REF signal is deasserted, the MEM TYPE indicators are used to select one of the internal buses for the current operation of common bus 9. MEM TYPE includes information as to the memory type and the access rights of the memory. Memory types include RAM, ROM, and PC Card. The access rights define whether a particular memory type is assigned as READ Only, WRITE Only, READ/WRITE, or DISABLED.

When a memory bus cycle is detected, the MEM TYPE indicators are checked to determine the memory type and access rights. Multiple memory types for the same bus cycle are permitted, however, they must have different access rights, or similar addressing methods. Each selected memory type's access rights are checked against the cycle type, Read cycle or Write cycle. If the memory type specified is enabled for that type cycle, then its corresponding address bus is output on the A[0:25] bits of bus 9. If the access rights for that device indicate that it is not enabled, the A[0:25] bits are driven by the internal SA bus, or from the internal address bus of one of the other memory devices, if it has also been specified within the MEM TYPE indicators and meets the access rights for that cycle.

The speed classification of the cycle is determined by the SPEED indicators from multiplexer 161-3. These signals define the bus timing clock source and the number of bus wait states which are to be added to the current bus cycle. The bus timing clock source may be selected as FAST which uses the processor clock source, CPUCLK, or SLOW which uses the alternate clock source, ALTCLK. The number of bus wait states applied to the current bus cycle determines the number of extra bus clock cycles that will be required before the bus cycle can be completed.

When the speed classification is SLOW, or when it is FAST and the number of wait states is not zero, the bus processing unit 31 of FIGS. 5 and 6 forces the CPU to extend the bus cycle to allow the accessed device enough time to respond. This forcing is accomplished by controlling the RDY signal to processor 21. The bus processing unit 31 extends CPU cycles as a result of one of four requesting sources, internally specified wait states, through the use of the IOCHRDY signal available on the STAT/CTL bus from ISA units 5 of FIG. 1 or when the internal display controller 34 asserts DISP REF to request control of the bus to perform display refresh operations or when REFRDY is asserted indicating that DRAM must be refreshed.

During CPU cycles, bus status is decoded from the processor STATUS bus, S[0:2] signals, as follows:

| S2 | S1 | S0 | Bus Operation |
|----|----|----|---------------|
| 0  | 0  | 0  | Interrupt Acknowledge |
| 0  | 0  | 1  | Read I/O |
| 0  | 1  | 0  | Write I/O |
| 0  | 1  | 1  | Halt |
| 1  | 0  | 0  | Instruction Fetch (Read Memory) |
| 1  | 0  | 1  | Read Memory |
| 1  | 1  | 0  | Write Memory |
| 1  | 1  | 1  | Passive (no bus cycle) |

During DMA cycles, bus status is derived from the DMA STATUS line of DMA controller 35 as follows:

| IORD = 0 | Read I/O and Write Memory |
|----------|---------------------------|
| MEMR = 0 | Read Memory and Write I/O |

BPU Pin Mapping

The pin mapping of the of the bus processing unit 31 of FIG. 6 is typical of the mapping of the functional blocks that form the engine 10 of the FIG. 1 and FIG. 3 computer systems. For that mapping in the bus processing unit 31, the input multiplexers 161-1, 161-2 and 161-3 map the input signals in the manner described. Multiplexer 161-1 selects the input signals from the ISTATUS lines for single unit operation of FIG. 1 and selects the external pins [20, 19, 18, 16] for the XSTATUS lines for the double-chip distributed operation of FIG. 3. Multiplexer 161-2 selects the IMEM-TYPE lines for the single-chip operation and the XMEM-TYPE lines for the double-chip operation. Multiplexer 161-3 selects the ISPEED lines for the single-chip operation XSPEED lines for the double-chip operation.

The external pin [52] connected for with the IOCHRDY line connects as an input to the wait state control 87. Pin [52] is connected for other uses in the second unit for the double-chip system.

In FIG. 6, the output multiplexers 162-1, 162-2, . . . 162-5 of the mapper 121-2 function to select outputs.

During the signal-chip operation, multiplexer 162-1 selects the SPK signal to be output on pin [151]. During the double-chip operation, multiplexer 162-1 selects the SPK signal to be output on pin [151] for second-unit operation and the ALE signal for first-unit operation.

Multiplexer 162-2 selects the ICYC TYPE signals for the decoder 86 for single-chip operation and first unit double chip operation and XCYC TYPE signals for double-chip second unit operation.

Multiplexer 162-4 selects the NCBEN1 and NCBEN0 signals for output on the pins [134,133] for single-chip and double-chip second unit operation. The multiplexer 162-5 selects the TXD signal for single-chip and second unit double-chip operation and the ready signal (READY) for first unit operation.

Full details of the bus processing unit 31 pin mapping for the single-chip functional blocks are shown in the following TABLE 1 under the SINGLE UNIT column.

TABLE 1 also shows the correspondence between the pin mapping for single-chip operation and the pin mapping for double-chip operation. For the two-chip embodiment of TABLE 1, a first one of the chips has the pin mapping as indicated in the FIRST UNIT column and a second one of the chips has a pin mapping as shown under the column SECOND UNIT.

BPU Distributed Two-Chip Operation

In the FIG. 3 integrated computer system using a first unit engine 10 and a second unit engine 10', the mapping of the pins for the first unit are shown in TABLE 1 under the FIRST UNIT column and the pin mapping for the engine 10' pins are shown under the column SECOND UNIT.

Referring to FIG. 6, the first unit mapping for the input pin is the same as the mapping for the single unit FIG. 6 operation. Specifically, mapping for the engine 10 in FIG. 3 for the bus processing unit is the same as the input pin mapping for the engine 10 of FIG. 1. Specifically, the pin numbers [20, 19, 18, 16] connect to the data bus lines D15, D14, D13, and D11, respectively. Similarly, the input pin 52 receives the IOCHRDY signal. Similarly, for the first unit for engine 10 of FIG. 3, the output pins [54, 55, 56, 57] receives the same signals as for the single unit of FIG. 1, namely the NSIOWR, NSIORD, NSMWR, and NSMRD signals, respectively. The output pins [134, 133 for the first unit engine 10 of FIG. 3. The multiplexer 162-5 in the first unit for the engine 10 of FIG. 3 outputs the ready signal in place of the TXD signal output by the single unit.

The output pin [151] for the first unit operation outputs the ALE signal instead of the SPEAKER signal (SPK) normally output by the single unit of FIG. 1.

Again referring to FIG. 6 and the bus processing unit 31 as embodied in the second unit comprising engine 10' of FIG. 3, the following mapping occurs.

For the second unit the pins [20, 19, 18] connect to the status bus S2, S1, and S0 with the BS2, BS1, BS0 signals. The pin [16] receives the BHEB connection which receives the BHEB signal from the first unit via pin [78]. The BHEB signal is from a different functional unit than the bus processing unit.

In the second unit, the pin [52] receives the ALE signal which connects to the first unit pin [151].

In the second unit, the pins [134] [133] have the same function as the single unit for engine 10 of FIG. 1, namely for the signals NCBEN 1 and NCBEN 0. In the second unit, the pin [82] has the same function for the TXD signal as does the single unit. The pin [151] in the second unit has the same function for the SPK signal as does the single unit.

As can be seen from TABLE 1, the bus processing unit has its pin functions distributed between the first unit and the second unit for the distributed unit of FIG. 3 using two chips, one for the first unit and one for the second unit.

In TABLE 1, pin assignments in either the first unit or the second unit which have the same function as in the single unit are marked with an @. Pins in the first or the second unit which connect to the in circuit emulator 114 of FIG. 3 for the CPU interface are marked with a +. Pins in the first unit or the second unit which interconnect between the first and the second units for the between chip interface are marked with a %.

In FIG. 5, the engine shown appears both as engine 10 in FIG. 3 and as engine 10' in FIG. 3. When the FIG. 5 engine is employed in the engine 10 of FIG. 3, only the functional block marked with a # are enabled for a master operation of the first unit. Similarly when the FIG. 5 engine is used as engine 10' in FIG. 3, only the functional block marked with an * are enabled in the slave unit of engine 10'. With the distributed system of FIG. 3, the CPU 21 in the FIG. 5 engine is disabled in both the engine 10 of FIG. 3 and the engine 10' of FIG. 3, since the CPU functions are implemented in the ICE 14 of FIG. 3.

In FIG. 5, the multiplexer 210 is part of the mapper unit 121 when the FIG. 5 engine 10 of FIG. 3 and is part of the mapper unit 121' when the engine of FIG. 5 responds to the engine 10' of FIG. 3. The multiplexer 210 functions to connect the CPU interface for the disabled CPU 21 in FIG. 5 externally to the ICE unit 14. This manner, the CPU functions are performed externally in the distributed system of FIG. 3.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A processing system comprising:
   an engine including,
   a chip having a plurality of functional circuits for performing a plurality of functions,
   a plurality of Input/Output pins,
   a plurality of selectable connectors internal to said chip and configured to connect selected ones of the functional circuits provided on said chip to selected ones of the Input/Output pins, and
   a selection device configured to select said selectable connectors, and in a first mode, connecting a first set of said functional circuits to a first set of said Input/Output pins, and in a second mode, connecting a second set of said functional circuits to a second set of said Input/Output pins, so that different functional circuits are functionally accessible at said Input/Output pins via said connectors as selected by said selection device in said second mode; and
   a controller configured to control the connectors in relation to the connections selected by means of the selection device.

2. A distributed system for performing a plurality of system functions comprising:
   a plurality of interconnected engines, each including,
   a plurality of functional circuits for performing a plurality of respective engine functions,
   a plurality of Input/Output pins, and
   a plurality of selectable connectors internal to each said engine and configured to connect selected ones of the functional circuits to selected ones of the Input/Output pins;
   connections which interconnect said Input/Output pins of said engines; and
   a controller configured to control said selectable internal connectors of said plurality of interconnected engines such that a selected functional circuit of one engine receives as an input, via the Input/Output pins of said one engine, said connections and the Input/Output pins of an other engine, an output of a selected functional circuit of said other engine.

3. The distributed system of claim 2, wherein each said engine comprises a chip having said selectable connectors internal to said chip, and the chip of each engine is identical.

4. A distributed system comprising:
   a plurality of interconnected engines, each capable of performing a common system function and each including,
   a plurality of functional circuits for performing a plurality of respective engine functions,
   a plurality of Input/Output pins, and
   a plurality of selectable internal connectors internal to each said engine and configured to connect selected ones of the functional circuits to selected ones of the Input/Output pins;
   connections which interconnect at least one Input/Output pin of at least one engine with at least one Input/Output pin of an other engine, and
   a controller configured to control said selectable connectors of said plurality of engines such that a selected functional circuit of said at least one engine receives as an input an output of a selected functional circuit of said other engine and portions of said common system function are distributed for performance by functional circuits of different of said interconnected engines.

5. The distributed system of claim 4, wherein each said engine comprises a chip having said selectable connectors internal to said chip, and the chip of each engine is identical.

* * * * *